United States Patent
Wey

(10) Patent No.: US 10,378,586 B2
(45) Date of Patent: Aug. 13, 2019

(54) BEARING CAGE WITH LUBRICATION CHANNEL

(71) Applicant: Schaeffler Technologies AG & Co. KG, Herzogenaurach (DE)

(72) Inventor: Edward J. Wey, Waxhaw, NC (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 0 days.

(21) Appl. No.: 15/681,830

(22) Filed: Aug. 21, 2017

(65) Prior Publication Data
US 2019/0055988 A1    Feb. 21, 2019

(51) Int. Cl.
*F16C 33/46* (2006.01)
*F16C 33/66* (2006.01)

(52) U.S. Cl.
CPC ...... *F16C 33/6651* (2013.01); *F16C 33/4605* (2013.01)

(58) Field of Classification Search
CPC .. F16C 33/3806; F16C 33/4605; F16C 33/66; F16C 33/6614; F16C 33/6651
See application file for complete search history.

(56) References Cited

U.S. PATENT DOCUMENTS

| | | | | |
|---|---|---|---|---|
| 2,219,031 A | * | 10/1940 | Frauenthal | F16O 33/6681 384/572 |
| 3,597,031 A | * | 8/1971 | Bill | F16C 33/6651 384/470 |
| 8,622,622 B2 | * | 1/2014 | Solfrank | F16C 33/3806 384/470 |
| 2013/0004111 A1 | * | 1/2013 | Sadamura | F16C 33/6651 384/572 |
| 2015/0292557 A1 | | 10/2015 | Wey | |

FOREIGN PATENT DOCUMENTS

| | | | |
|---|---|---|---|
| CN | 105257703 A | | 1/2016 |
| JP | H538419 | * | 5/1993 |
| JP | 2000-130442 | * | 5/2000 |

OTHER PUBLICATIONS

Translation of JPH538419 obtained Jan. 17, 2019.*
Increasing the Performance of Planetary Bearings for Modern Automatic Transmissions—Alexander Pabst / Frank Beeck—dated Jun. 20, 2012.

* cited by examiner

*Primary Examiner* — James Pilkington
(74) *Attorney, Agent, or Firm* — Volpe and Koenig, P.C.

(57) ABSTRACT

A roller-cage assembly that provides both improved lubrication and reduced contact surface of the cage is disclosed. The roller-cage assembly includes a plurality of rolling elements and a cage. The cage includes a first radial flange, a second radial flange, and a plurality of crossbars extending therebetween that define a plurality of rolling element pockets. The plurality of rolling elements are located in at least some of the plurality of rolling element pockets. The plurality of crossbars each include lateral surfaces that support the plurality of rolling elements. The cage includes a radial support surface that includes at least one recess. The at least one recess serves as a lubrication reservoir as well as provides a reduction in surface area of the radial support surface against an associated support element, such as a housing, shaft, or bearing ring.

7 Claims, 2 Drawing Sheets

BEARING CAGE WITH LUBRICATION CHANNEL

FIELD OF INVENTION

This application is generally directed to a rolling bearing assembly, and is more particularly related to a cage for rolling elements in a rolling bearing assembly.

BACKGROUND

Some roller bearings include cylindrical rolling elements, or needle bearings, held in circumferential positions within a cage. In certain needle roller bearing applications, a flow of lubricant may be provided to the rolling elements to enhance bearing performance and reduce wear. Some known types of cage with enhanced lubrication features are disclosed in U.S. Pub. 2015/0292557 and CN Pub. 105257703.

One type of known needle roller bearing includes a cage that both holds rolling elements and provides a radial support surface for contacting a surrounding support element, such as a housing, a shaft, or a bearing ring. Excessive contact between the radial support surface of the cage and the surrounding support element can cause undesirable heat and abrasive wear.

A need exists for a cage that both facilitates lubricant flow to rolling elements and reduces undesirable excessive contact between the cage and a surrounding support element.

SUMMARY

A roller-cage assembly that provides both improved lubrication and reduced contact of the cage with respect to a surrounding support element is disclosed. The roller-cage assembly includes a plurality of rolling elements and a cage. The cage includes a first radial flange, a second radial flange, and a plurality of crossbars extending therebetween that define a plurality of rolling element pockets. The plurality of rolling elements are located in at least some of the plurality of rolling element pockets. The plurality of crossbars each include lateral surfaces that support the plurality of rolling elements. The cage includes a radial support surface that includes at least one recess. The at least one recess provides both a lubrication reservoir and a reduction in surface area of the radial support surface against a surrounding support element, such as a housing, a shaft, or a bearing ring.

Preferred arrangements with one or more features of the invention are described below and in the claims.

BRIEF DESCRIPTION OF THE DRAWINGS

The foregoing Summary as well as the following Detailed Description will be best understood when read in conjunction with the appended drawings. In the Drawings.

To facilitate understanding, identical reference numerals have been used, where possible, to designate identical elements that are common in the figures. It is contemplated that elements and features of one embodiment may be beneficially incorporated in other embodiments without further recitation.

DETAILED DESCRIPTION

Figure 1:
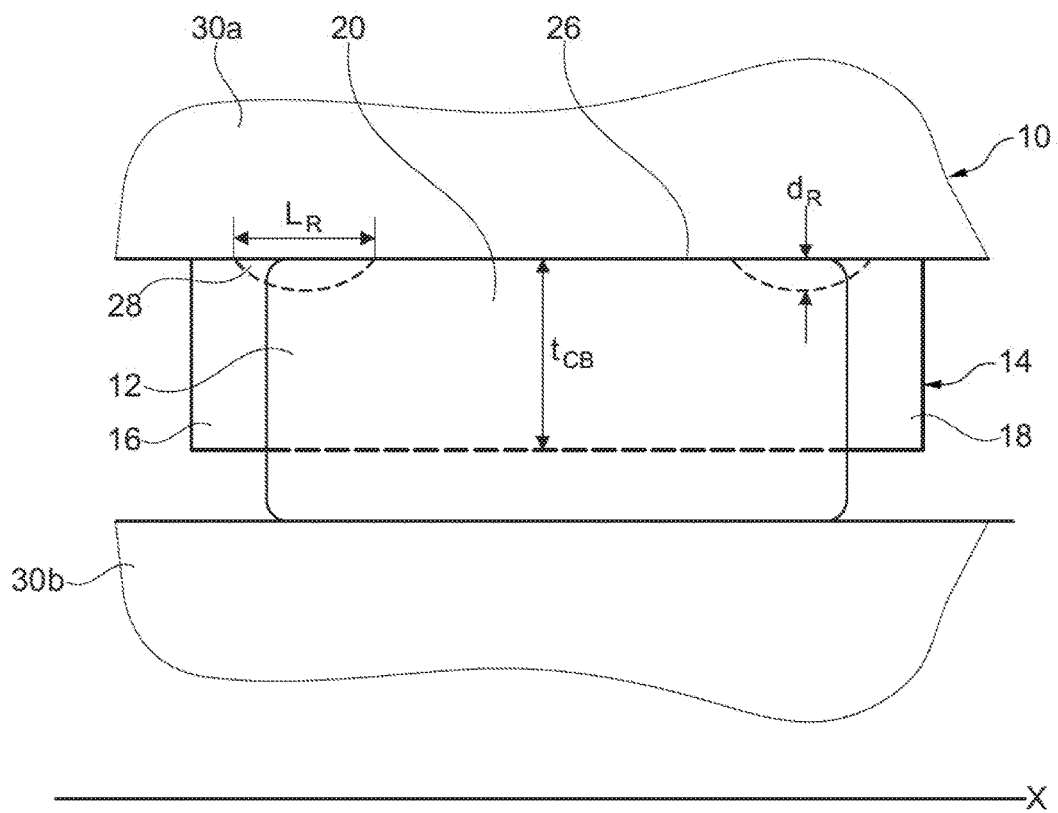
FIG. 1 is a cross-sectional view through a roller-cage assembly according to one embodiment.

Certain terminology is used in the following description for convenience only and is not limiting. The words "inner," "outer," "inwardly," and "outwardly" refer to directions towards and away from the parts referenced in the drawings. A reference to a list of items that are cited as "at least one of a, b, or c" (where a, b, and c represent the items being listed) means any single one of the items a, b, or c, or combinations thereof. The terminology includes the words specifically noted above, derivates thereof, and words of similar import.

Figure 2:
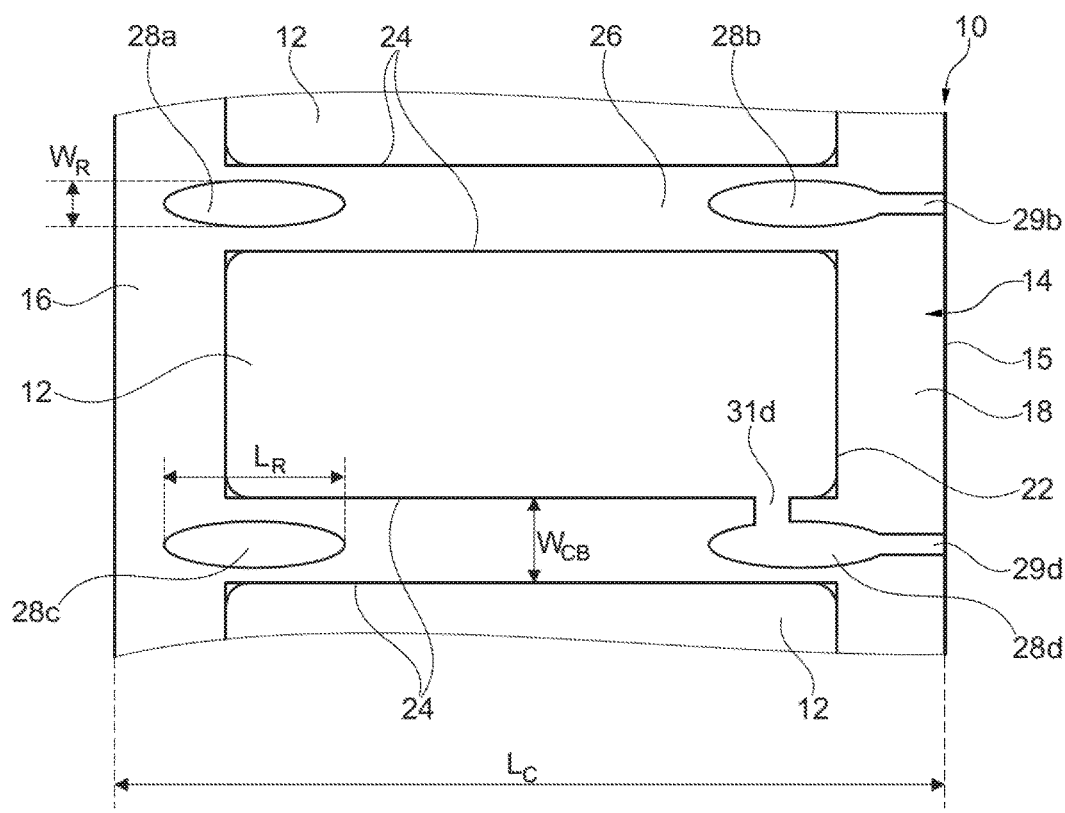
FIG. 2 is a partial elevational view in a radial direction of a cage for supporting rolling elements in a roller-cage assembly according to one embodiment.

As shown in FIGS. 1 and 2, a roller-cage assembly 10 is disclosed. The roller-cage assembly 10 includes a plurality of rolling elements 12 and a cage 14. The plurality of rolling elements 12 are preferably needle rollers. One of ordinary skill in the art would recognize from the present disclosure that alternative types of rolling elements can be used. The cage 14 includes a first radial flange 16, a second radial flange 18, and a plurality of crossbars 20 extending therebetween that define a plurality of rolling element pockets 22. The plurality of rolling elements 12 are located in at least some of the plurality of rolling element pockets 22. One of ordinary skill in the art would recognize from the present disclosure that rolling elements 12 can be located in every one of the rolling element pockets 22. As shown in FIG. 2, the plurality of crossbars 20 each include lateral surfaces 24 that support the plurality of rolling elements 12. During use, lubricant can be provided in a variety of ways to the rolling elements 12 to help improve efficiency of the roller-cage assembly 10 by reducing excessive friction and wear. It is desirable to provide a consistent and reliable film of lubricant to the associated bearing surfaces such that the service life of the roller-cage assembly 10 is prolonged.

The cage 14 includes a radial support surface 26 that includes at least one recess 28. The radial support surface 26 defines a bearing surface that contacts a support element. As shown in FIG. 1, the radial support surface 26 contacts a surrounding support element, including least one of a housing, a shaft, or a bearing ring 30a, 30b. One of ordinary skill in the art recognizes from the present disclosure that the radial support surface 26 can contact other types of support elements. The recess 28 provides both a lubrication reservoir pocket that increases a volume of lubricant available to the rolling elements 12, and reduces a surface area of contact of the cage 14 with the surrounding support element, i.e. the housing, shaft, or bearing ring 30a, 30b. Although the recess 28 in FIG. 1 is only illustrated on one radial surface of the cage 14, one of ordinary skill in the art would recognize that one or both of the radial surfaces of the cage 14 could include the recess 28.

The radial support surface 26 is preferably defined on a radially outer surface 32 of the cage 14. As shown in FIGS. 1 and 2, a majority of the recess 28 is defined on the flanges 16, 18. In one embodiment, as shown in FIGS. 1 and 2, the at least one recess 28 has a half-ellipsoidal profile. This type of profile provides curved surfaces that promote lubricant to flow from the recess 28 to the contact surfaces of the cage 14. One of ordinary skill in the art would recognize from the present disclosure that alternative shapes of the recess 28 can be used.

As shown in FIG. 2, the at least one recess 28 can include a plurality of recesses 28a-28d. As shown in FIG. 2, in one embodiment, the at least one recess 28b, 28d also includes an axial channel 29b, 29d that extends to an axial end face 15 of the cage 14. Although only two of these types of recesses are shown in FIG. 2, one of ordinary skill in the art would recognize that none, some, or all of these types of recesses could be provided on the cage. Other types of channels or flow paths for lubricant can also be provided on the radial support surface 26. For example, as shown in FIG.

2, an additional channel 31d is provided from the recess 28d in a circumferential direction towards the rolling element 12.

As shown in FIGS. 1 and 2, the at least one recess 28 is partially arranged on both (1) at least one of the first radial flange 16 or the second radial flange 18, and (2) at least one of the plurality of crossbars 20. Each recess of the plurality of recesses 28a-28d can be partially arranged on both (1) at least one of the first radial flange 16 or the second radial flange 18, and (2) at least one of the plurality of crossbars 20.

In one embodiment, a maximum depth ($d_R$) of the recess 28 is between 3%-7% of a thickness ($t_{CB}$) of one of the plurality of crossbars 20, and is preferably about 5% of the thickness ($t_{CB}$) of one of the plurality of crossbars 20. In one embodiment, the recess 28 has a length ($L_R$) that is between 5%-15% of a length ($L_C$) of the cage 14, and is preferably about 10% of the length ($L_C$) of the cage 14. In one embodiment, the recess 28 has a width ($W_R$) that is between 30%-50% of a width ($W_{CB}$) of one of the plurality of crossbars 20, and is preferably about 40% of the width ($W_{CB}$) of one of the plurality of crossbars 20.

Having thus described various embodiments of the present roller-cage assembly in detail, it is to be appreciated and will be apparent to those skilled in the art that many physical changes, only a few of which are exemplified in the detailed description above, could be made in the apparatus without altering the inventive concepts and principles embodied therein. The present embodiments are therefore to be considered in all respects as illustrative and not restrictive, the scope of the invention being indicated by the appended claims rather than by the foregoing description, and all changes which come within the meaning and range of equivalency of the claims are therefore to be embraced therein.

LIST OF REFERENCE NUMBERS

Roller-cage assembly 10
Rolling elements 12
Cage 14
First radial flange 16
Second radial flange 18
Crossbars 20
Pockets 22
Lateral surfaces 24
Radial support surface 26
Recess 28, 28a, 28b, 28c, 28d
Axial channel 29b, 29d
Housing, shaft, bearing ring 30a, 30b
Channel 31d
Radially outer surface 32
Depth of recess ($d_R$)
Thickness of crossbar ($t_{CB}$)
Length of recess ($L_R$)
Length of cage ($L_C$)
Width of recess ($W_R$)
Width of crossbar ($W_{CB}$)

What is claimed is:

1. A roller-cage assembly comprising:
    a plurality of rolling elements; and
    a cage including a first radial flange, a second radial flange, and a plurality of crossbars extending therebetween that define a plurality of rolling element pockets, the plurality of rolling elements being located in at least some of the plurality of rolling element pockets, the plurality of crossbars each including lateral surfaces that support the plurality of rolling elements,
    the cage includes a radial support surface that includes at least one recess,
    the at least one recess is partially arranged on both (i) at least one of the first radial flange or the second radial flange, and (ii) at least one of the plurality of crossbars,
    the at least one recess includes (i) an axial channel that extends to an axial end face of the cage, and (ii) a circumferential channel that extends to one of the rolling element pockets, and
    the recess has a length that is between 5%-15% of a length of the cage.

2. The roller-cage assembly of claim 1, wherein the radial support surface is defined on a radially outer surface of the cage.

3. The roller-cage assembly of claim 1, wherein the plurality of rolling elements are needle rollers.

4. The roller-cage assembly of claim 1, wherein the at least one recess includes a plurality of recesses, and each recess of the plurality of recesses is partially arranged on both (1) at least one of the first radial flange or the second radial flange, and (2) at least one of the plurality of crossbars.

5. The roller-cage assembly of claim 1, wherein the at least one recess has a half-ellipsoidal profile.

6. The roller-cage assembly of claim 1, wherein a maximum depth of the recess is between 3%-7% of a thickness of one of the plurality of crossbars.

7. The roller-cage assembly of claim 1, wherein the recess has a width that is between 30%-50% of a width of one of the plurality of crossbars.

* * * * *